United States Patent [19]
Graham et al.

[11] Patent Number: 5,696,790
[45] Date of Patent: Dec. 9, 1997

[54] METHOD AND APPARATUS FOR TIME DEPENDENT DATA TRANSMISSION

[75] Inventors: Martin H. Graham, Berkeley; Matthew Taylor, Pleasant Hill; Mark Miller, Oakland; Kevin Braun, Pleasanton, all of Calif.

[73] Assignee: Tut Systems, Inc., Pleasant Hill, Calif.

[21] Appl. No.: 538,847

[22] Filed: Oct. 4, 1995

[51] Int. Cl.$^6$ ................................................. H03K 7/08
[52] U.S. Cl. ................................................. 375/238
[58] Field of Search ................................ 375/238, 239; 332/109, 112; 329/312, 313; 340/825.63, 825.64; 370/212

[56] References Cited

U.S. PATENT DOCUMENTS 4,817,115  3/1989  Campo et al. ........................ 375/238

Primary Examiner—Stephen Chin
Assistant Examiner—Kevin Kim
Attorney, Agent, or Firm—Blakely, Sokoloff, Taylor & Zafman

[57] ABSTRACT

An encoding and decoding mechanism for communicating digital data where the binary states are represented by a duration of time between transitions of a signal. For instance, the time between zero crossings of a signal are used to represent binary states. These times can be selected so as to avoid ambiguities between the binary state being detected even where the transmission medium is irregular. A typical application is the creation of a LAN in a home using twisted pair telephone lines. The LAN can be made to be transparent and independent of telephone service received over lines shared with the LAN.

6 Claims, 4 Drawing Sheets

METHOD AND APPARATUS FOR TIME DEPENDENT DATA TRANSMISSION

BACKGROUND OF THE INVENTION

1. Field of the Invention

The invention relates to the field of encoding and decoding digital data for transmission.

2. Prior Art

When digital data is encoded for transmission it typically requires a receiver that periodically senses the amplitude of the encoded signal. For instance, for Manchester or phase encoding, the amplitude of the received signal is sensed under control of a clock signal synchronized with the transmitter. If the interval for transmitting a bit is T, the maximum frequency of the fundamental is 1/THz. The minimum frequency is also 1/THz, and the time to transmit a bit is T or 1/T bits per second. As will be seen the present invention departs from this technique and in effect, instead of measuring amplitude at a predetermined time, measures time at a predetermined amplitude.

In some applications it is extremely difficult to realize a local area network (LAN) using traditional encoding such as Manchester or phase encoding. FIG. 1 illustrates the telephone wiring found in a typical home. Most often the telephone wiring comprises twisted pair lines which connect to a central office at a single connection 10. From connection 10 a plurality of twisted pair lines fan out as shown to numerous phone jacks in the home. For instance, line 11 illustrates 50' of line connected to a phone jack which jack is connected to both a telephone and a computer. Another line 12 is coupled to a computer. A 60' line 13 is connected to a jack 15 which in turn is connected to two other lines. One of these lines is connected to a telephone, computer and printer while the other line is unterminated. One other 14 line is connected to jack 16 which in turn is connected to a telephone.

Assume that it is desirable to have a LAN interconnecting the three computers and printer shown in FIG. 1. The twisted pair lines interconnecting these three computers as can be seen have an irregular topology making it difficult to transmit a typical Ethernet or similar signal. Note for instance, at least one of the lines is unterminated while another is terminated in only a telephone. Also the lines themselves may have different characteristics since, for instance, they could have been installed at different times with different qualities of cable.

The present invention is designed to provide a method and apparatus for allowing the computers and printer of FIG. 1 to operate in a LAN independently and transparently to the operation of ordinary telephone service while sharing the same lines.

SUMMARY OF THE INVENTION

A method for transmitting data where data is transmitted by at least two states is described. In its broadest terms the invention comprises using a first signal having a first duration to represent one digital state and a second signal having a second duration different than the first duration to represent a second digital state. The first and second signals transition through a predetermined electrical condition such as zero volts for each transmitted data state without a time delay between the first and second signals. In one embodiment the signal changes from one polarity to the next for each bit. In another embodiment the first signal and second signal have different amplitudes such that the product of the first amplitude and first duration approximately equals the product of the second amplitude and second duration. This assures that there is no DC component. In yet another embodiment the duration of the signals are pseudorandomly dithered to spread the spectrum of the transmitted data thereby reducing the effects on the transmitted signal caused by narrow band signals.

By way of example, one of the signals may have half the duration of the other and the zero crossing of the signal is detected. Each time the signal crosses zero volts a receiver determines whether the period between the last crossing and the present crossing is one of the two intervals. As can be appreciated, the intervals may be selected so that signals on networks with irregular topology and other anomalies which would ordinarily not be suitable for more traditional encoding will nonetheless be accurately detected.

DETAILED DESCRIPTION OF THE PRESENT INVENTION

A method and apparatus for encoding and decoding binary data for transmitting and receiving the data particularly in a network having irregular topography as well as other networks is disclosed. In the following description, numerous specific details are set forth such as specific time intervals in order to provide a thorough understanding of the present invention. It will be apparent that the present invention may be practiced without these specific details. In other instances, well-known circuits are shown in block diagram form, in order not to unnecessarily obscure the present invention.

Figure 2:
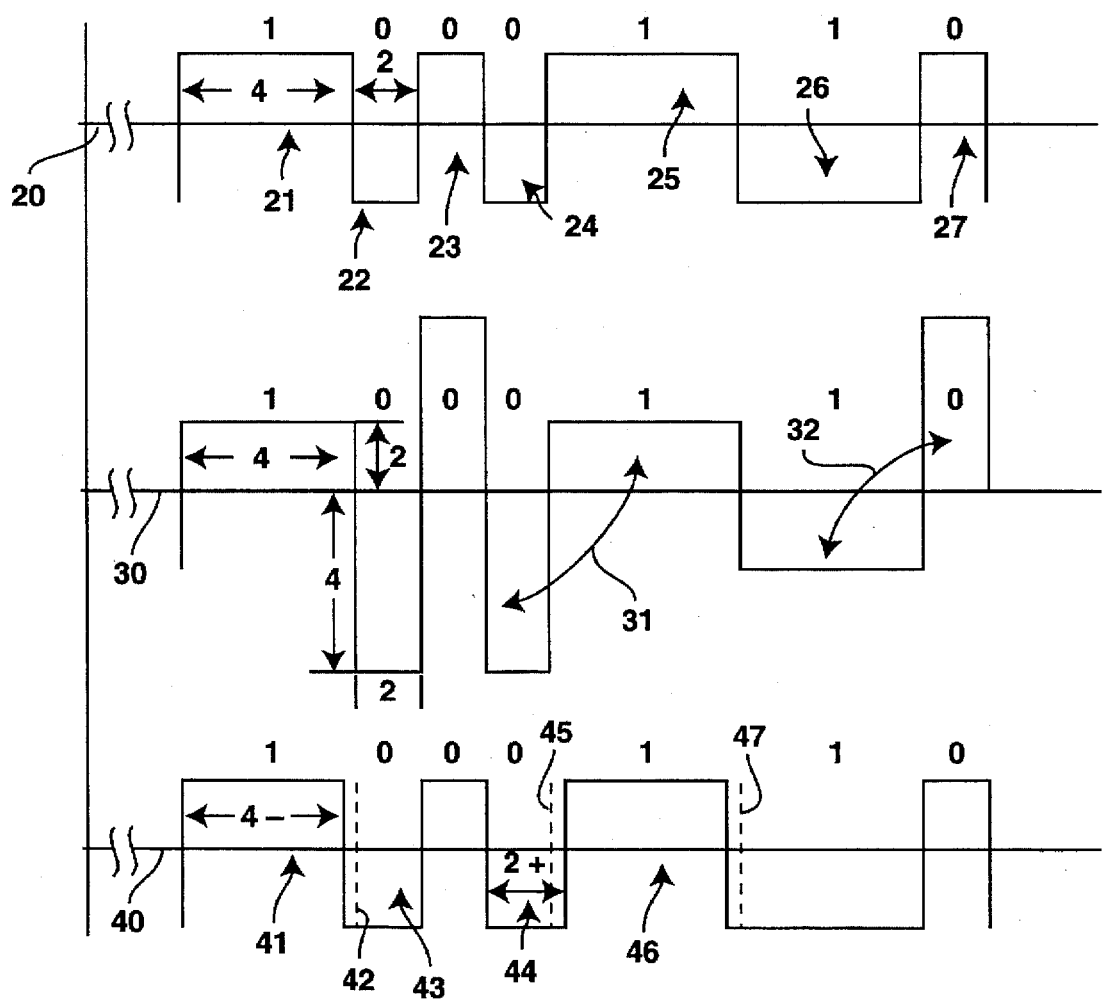
FIG. 2 is a series of waveforms which show the encoding of the present invention.

Referring to FIG. 2, a digital bit stream comprising "1000110" is shown encoded to illustrate the general teachings of the present invention. A binary 1 is encoded with a first signal 21 having a duration of four units (e.g., 16 microseconds) and a binary 0 is encoded with a signal 22 having a duration of two units (e.g., 8 microseconds). There is, for the example shown, a transition from one polarity to the other polarity for each binary bit encoded. Thus, to encode the bit stream 1000110 there is a first signal 21 of a first polarity having a duration equal to four units followed by the signal 22 of opposite polarity having a duration, for the example illustrated, of two units. A signal 23 which is of opposite polarity of the signal 22, is of two units in duration since it represents a binary 0. This is followed by the signal 24 which is again two units because it represents a binary 0. Following this there are two signals 25 and 26 each of four units in duration and of opposite polarity to one another representing the next two binary 1s in the bit stream. Finally, the signal 27 is shown which represents the final binary 0, this pulse is of opposite polarity to signal 26 and is two units in duration.

As can be appreciated from the waveform on line 20, it is a relatively simple task to discern the difference between a signal having a duration of four units versus one having a duration of two units. Even in a network with irregular topology, measuring the duration as opposed to the amplitude of a signal is much easier. For instance, to decode the digital information for the waveform shown on line 20, zero crossings (0 volts) can be detected and a counter used to determine whether four time units or two time units occurred between zero crossings.

What in effect occurs with the waveform on line 20 is that instead of detecting the amplitude of the waveform at a time certain, this technique detects a predetermined electrical condition such as 0 volts and then determines the time. Because of noise found in the system, typically a sign change in the derivation of the signal is detected, or other well-known techniques may be used. The time can be selected to accommodate the difficulties encountered in a particular network e.g., each unit of the duration shown on line 20 can represent milliseconds as opposed to microseconds for some networks.

It should be noted that with the encoding of FIG. 2, the data rate is data dependent, for example, a string of binary ones will take longer to transmit than a string of binary zeros. While this may have some disadvantages, for instance requiring more buffering of data before transmission, it is not a significant disadvantage when compared to the gains such as no requirement for an absolute clock or time base.

It is possible with the encoding found on line 20 for there to be a DC component. For instance if one considers the signals 21, 22, 23, 24, and 25, taken alone, a DC component results. Note the signals 21 and 25 are positive for a longer period of time than the signals 22 and 24 are negative.

A zero DC component can be assured by selecting different amplitudes as shown on time line 30 of FIG. 2. The waveform on line 30 again represents the encoding of the binary bit stream "100110". Again, as was the case with the waveform on line 20 a binary 1 is represented by a signal of four units in duration and a binary 0 by a signal of two units in duration. Unlike the waveform on line 20, however, the amplitudes of the signals representing a binary 1 and the binary 0 are different. For the waveform on line 30, the amplitude of the signal representing a binary 1 is two units whereas the amplitude of the signal representing a binary 0 is four units. Thus, the product of the amplitude and duration for the signal representing the binary 1 is equal to the product of the amplitude and duration of the signal representing the binary 0. Since there is a transition from one polarity to the other for each digital signal, the net DC component is always zero for every two signals. That is, specifically referring to the waveform on line 30, the amplitude multiplied by the time interval for the two signals indicated by the arrow 31 are equal, as are the areas indicated by the arrow 32.

Another embodiment of the encoding of the present invention is found on line 40 of FIG. 2. Again, encoding for the bit stream "1000110" is illustrated with a binary 1 represented by a signal having a nominal duration of the four units and a binary 0 by a signal having a nominal duration of two units. Here, however, the duration is randomly modulated; that is, the duration is pseudorandomly increased or decreased by a relatively small amount (e.g., less than one unit for the example shown). This pseudorandom increasing and decreasing of the duration is referred to as dithering. The dithering has the effect of spreading the frequency spectrum of the signals being transmitted. In so doing, the effect, for example, of an interfering narrow band signal is lessened.

On line 40 the signal 41 representing a binary 1 is shortened in duration (e.g, one-half unit). The dotted line 42 represents the full four units for the signal 41 to show the amount that the signal 41 is shortened. The signal 43 is two units in duration, that is, it is not dithered. The signal 44, on the other hand, is longer in duration as indicated by the dotted line 45. The following signal 46 representing the binary one is shortened in duration as indicated by the dotted line 47.

The dithering illustrated on line 40 may be used in conjunction with the "zero DC" waveform shown on line 30 of FIG. 2.

Figure 3:
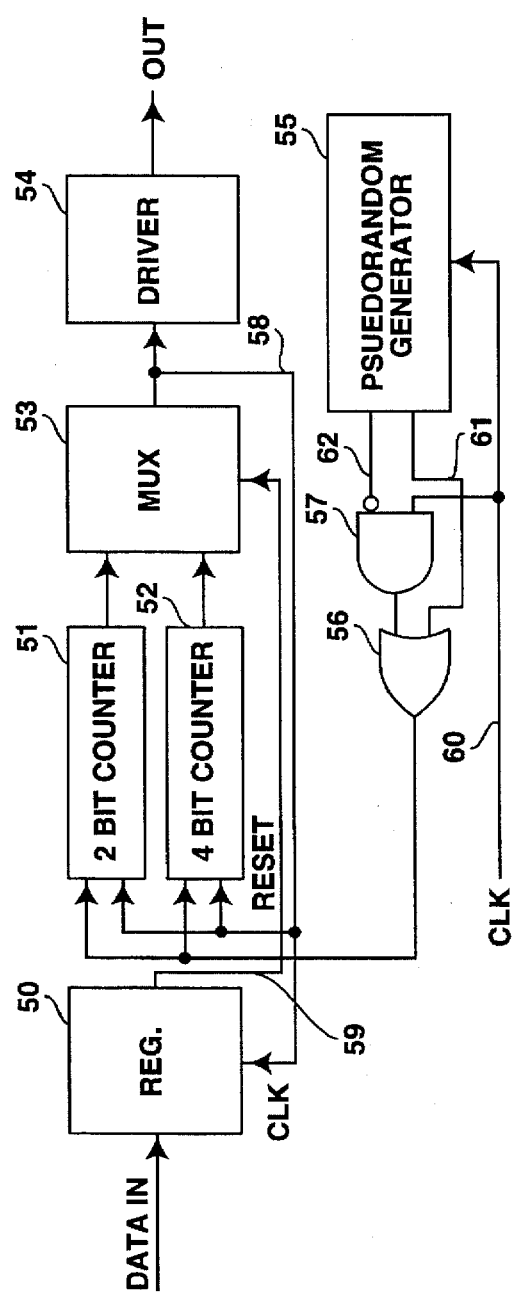
FIG. 3 is a block diagram of an encoder used to encode the waveforms illustrated in FIG. 2.

FIG. 3 illustrates a circuit which may be used to provide the dithered waveform of line 40 of FIG. 2. The data to be encoded is coupled to a register 50. The register 50 provides buffering to compensate for the differences in data in and data out rates. Each data bit to be encoded is coupled on line 59 to a MUX 53. The data (binary 1 or binary 0) selects an overflow signal from either the counter 51 or the counter 52. The output of the MUX is coupled to a driver 54 which provides the output signal as will be discussed in more detail.

The two nominal durations for the waveform on line 40 of FIG. 2 are determined by the counters 51 and 52. A clock signal on line 60 is coupled to the counters through the gates 56 and 57 as will be described causing the counters to count. The MUX selects the overflow signal from one of the two counters. If counter 51 is selected, it overflows after a reset in half the time required for the counter 52 to overflow. Thus, depending on which counter is selected, an overflow will occur in either a first duration or a second duration where one duration is twice the length of the other. The duration as mentioned, is selected by whether the register 50 is outputting a binary 1 or a binary 0. (A single counter may be used with a bit inserted into the counter for the shorted duration, this also eliminates the MUX.)

Assume for sake of discussion that the clock signal on line 60 is 1 MHz. This clock is coupled to one input terminal of AND gate 57. The inverting terminal of the AND gate 57 is coupled to a pseudorandom generator 55. The output of the AND gate 57 is coupled to one input terminal of an OR gate 56. The other input to the OR gate 56 is also coupled to the pseudorandom generator 55. The output of the OR gate 56 is used to clock the counters 51 and 52.

The pseudorandom generator 55 is also coupled to receive the clock signal on line 60. This generator pseudorandomly produces pulses on line 61 which are skewed in time with respect to the clock signal on line 60. In contrast, pseudorandom generator 55 produces pseudorandom pulses on line 62 which are synchronized with the clock signal on line 60. The pseudorandom pulses on lines 61 and 62 as currently preferred, occur relatively infrequently when compared to the clock frequency (e.g., once every 10–20 cycles of the clock) with the signals on lines 61 and 62 being independent of each other.

A pulse on line 62 acts to block the clock on line 60 from passing through gate 57 causing the counters 51 and 52 to skip a count. This lengthens the signals by one count such as shown on line 40 of FIG. 2. On the other hand, a signal on line 61 causes an extra count in the counters 51 and 52 thereby shortening the duration of the signals.

Once an overflow occurs from the selected counter it is used to reset the counters as shown by line 58, also this signal is used by the register 50 to clock the next bit to line 59. The output of the MUX 53 also is coupled to the driver 54 to provide the polarity change in the signal that occurs between each of the bits in the bit stream.

Figure 4:
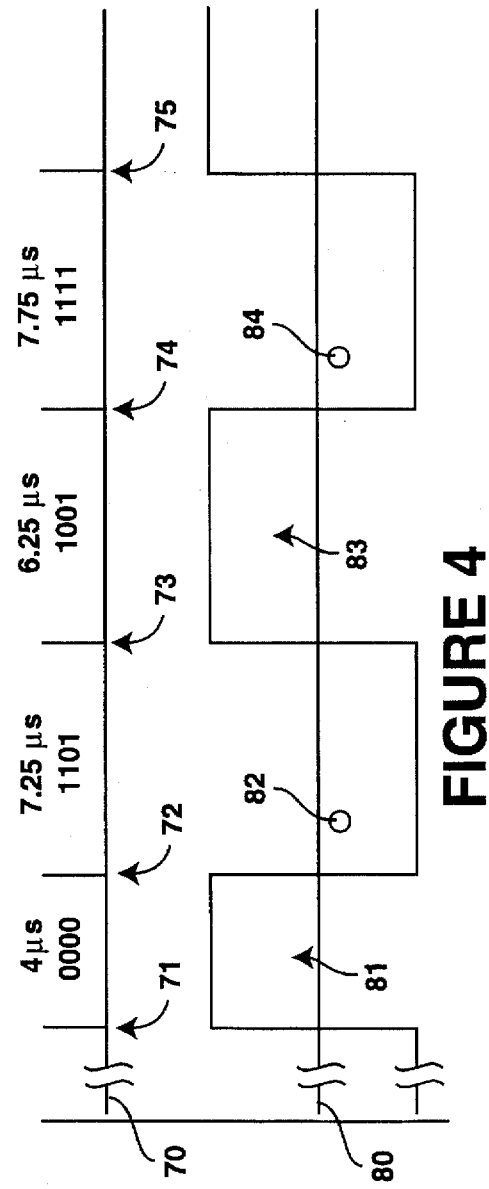
FIG. 4 illustrates alternate waveforms which may be used with the present invention.

In FIG. 4 another embodiment is illustrated where several different time intervals are used for encoding 4 bits of data in each signal. For the example illustrated, the first interval comprises 4 microseconds, the second interval 4.25 microseconds with each additional interval being 0.25 microseconds longer, the longest interval being 7.75 microseconds. Thus, there are 16 intervals ranging in time from 4 microseconds to 7.75 microseconds. As illustrated in FIG. 4 on the time line 70, a first pulse 71 defines the beginning of the first interval. Four microseconds later, pulse 72 indicates the end of the first interval this time is defined as equaling nibble 0000. Between the pulses 72 and 73, a 7.25 microseconds duration is shown corresponding to the nibble 1101. Then the next duration, defined between the pulses 71 and 74 is 6.25 microseconds, corresponding to the nibble 1001. Finally, between the pulses 74 and 75, a 7.75 microsecond duration occurs corresponding to the nibble 1111.

On line 80, the waveform corresponding to the pulses shown on line 70 is illustrated with the first signal 81 being a positive going signal having a duration of 4 microseconds. This is followed by a change in polarity to the signal 82 which has a duration of 7.25 microseconds. Then the signal 83 with a positive amplitude and a duration of 6.25 microseconds occurs and finally the signal 84 with a negative amplitude and a duration of 7.75 microseconds is shown.

In practice for many networks, distinguishing between signals which are different, one from the other, by at least 0.25 microseconds is relatively easy, even where a network has irregular topology. Thus, many of the advantages described above for the encoding of FIG. 2 are equally true for the encoding of FIG. 4. Additionally, while not shown, the amplitudes of the various signals shown on line 80 may be selected so that the duration of a particular signal multiplied by its amplitude is equal to a constant. This eliminates the DC component. Additionally, dithering may be used providing the dithering is relatively small when compared to the 0.25 microsecond difference in times used for distinguishing one signal from the other for the embodiment of FIG. 4.

Figure 5:
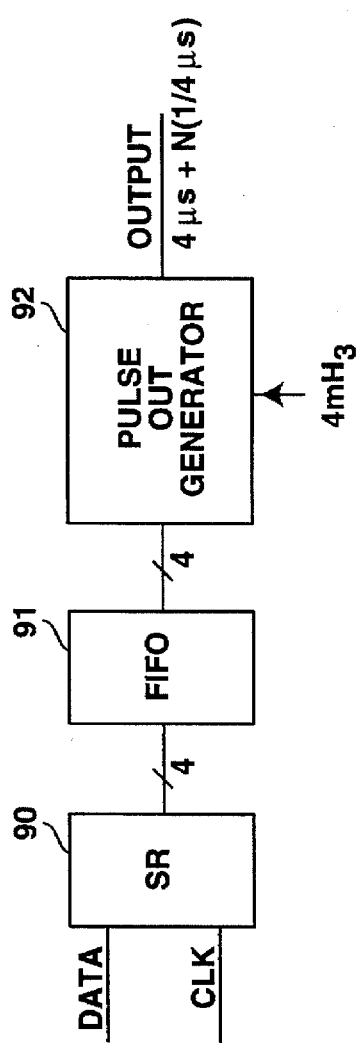
FIG. 5 is a block diagram of an encoder used to provide the waveforms of FIG. 4.

In FIG. 5 an encoder for providing the waveform shown in FIG. 4 is found. A shift register 90 receives the data and a clocking signal. The shift register 90 receives the data in serial form and then couples four bits at a time to the first-in-first-out (FIFO) register 91. Each nibble corresponds to the bits shown between the pulses on line 70 of FIG. 4. There are, of course, 16 different combinations of bits and the pulse-out generator 92 after counting 4 microseconds additionally counts a number of 0.25 microsecond periods corresponding to the value of the 4 bits. For example, for a binary code of 0101 after a first pulse the second pulse defining the nibble occurs 5.25 microseconds later corresponding to the equation 4 μsecs+N (¼ μsecs) where N is equal to the value of the 4 bits. As can be seen, the generator 92 receives the 4 MHz clock to enable it to count.

Figure 6:
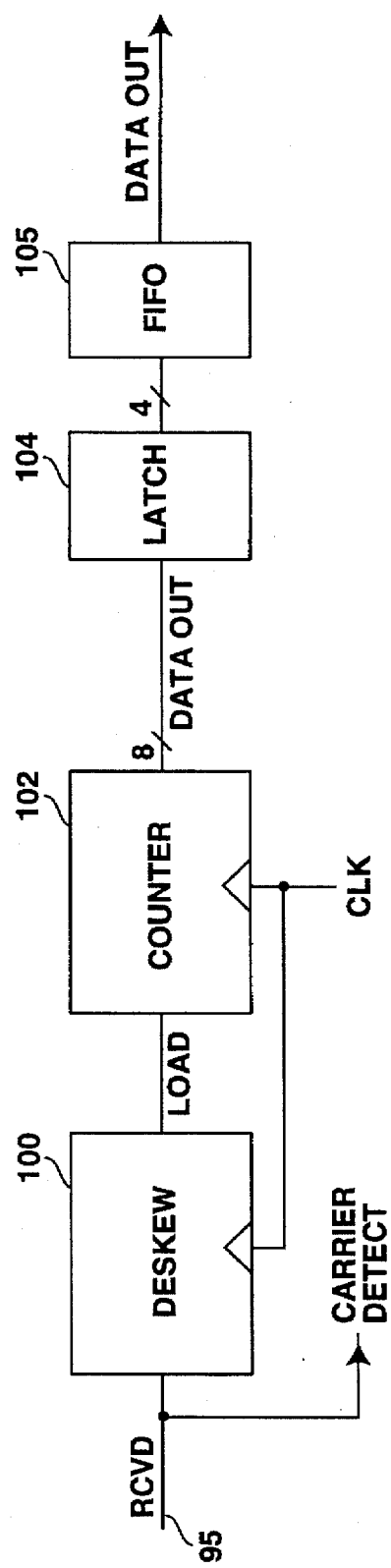
FIG. 6 is a block diagram of a decoder used to decode the waveforms of FIG. 4.

The receiver of FIG. 6 receives the waveform such as shown on line 80 of FIG. 4 and decodes it. The input data is coupled to a deskewing circuit 100 as well as to a carrier detect circuit not shown for detecting the presence of the data carrying signal. The deskewing circuit 100 aligns the transitions from one polarity to the next with the clock signal to enable the counter 102 to properly operate. A transition of the input signal causes a counter 102 to be loaded, for example with all binary zeros (or all binary ones if the output data from the circuit of FIG. 5 is inverted). The counter then counts until the next transition of the received signal is detected. When that transition is detected, the output of the data is coupled to a latch 104. For the embodiment under discussion, the counter 102 is an 8 bit counter. The lower 4 bits of the count corresponds to the 4 microseconds minimum interval period (16 counts). In the latch 104 the first 4 bits are ignored and the remaining 4 bits are coupled to the FIFO 105. This FIFO represents the 4 bit code such as shown on line 70 of FIG. 4.

Figure 1:
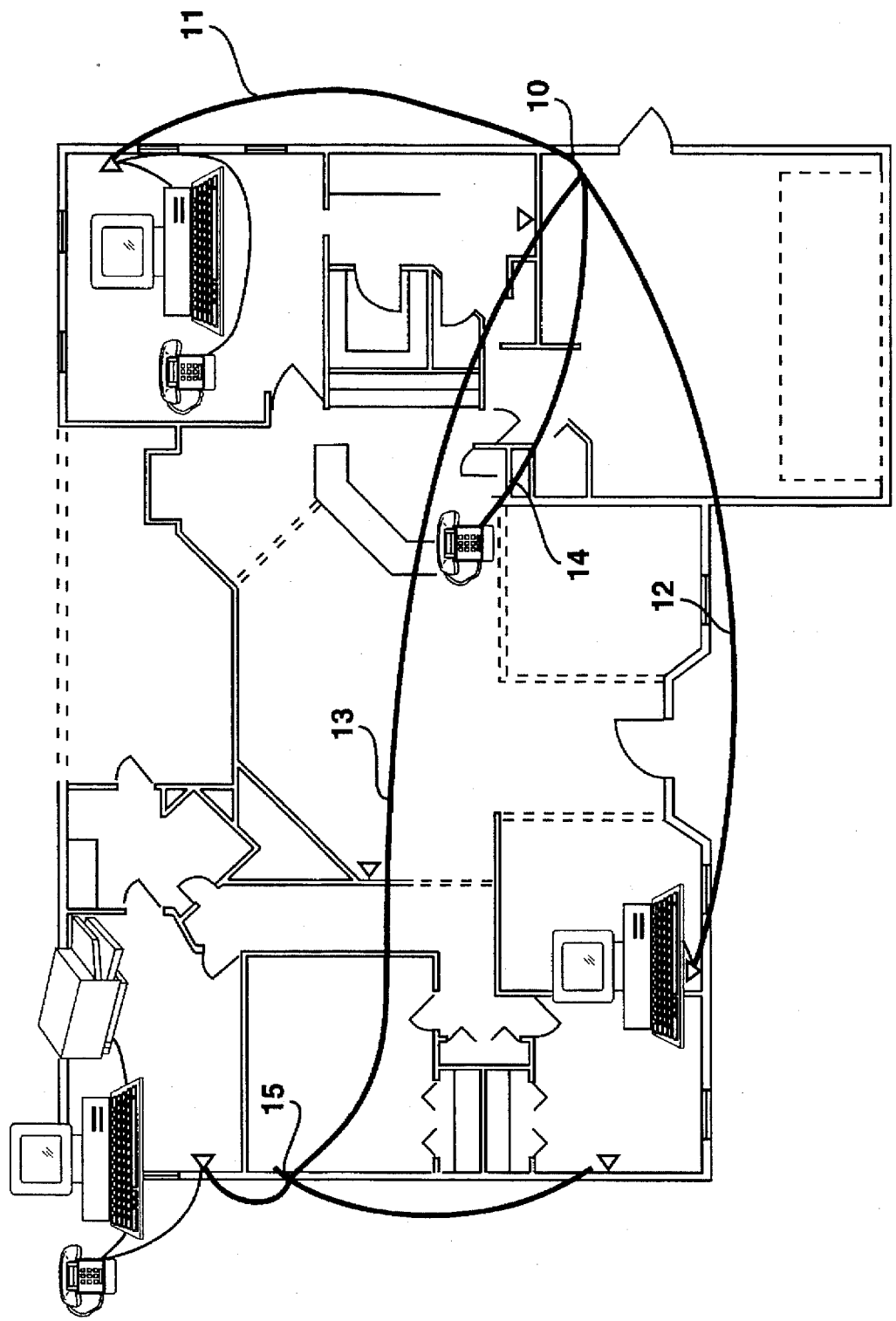
FIG. 1 is a plan view of a home used to illustrate the irregular topology that might be found in such an environment.

Referring again to FIG. 1, the encoding and decoding of the present invention may be used in a LAN such as shown in FIG. 1. Transmission on this network can be made to be transparent to ordinary telephone signals. Normally the telephone signals including the ringing occurs below 20 KHz. If each of the nodes connected to the LAN, such as the computer and printer shown in FIG. 1 are coupled through a high pass filter with a pass frequency of 20 KHz, they will be isolated from the normal telephone signals. For example, a simple two pole, two zero high pass filter will only pass approximately 10 millivolts from an inordinately large ringing voltage of 100 volts at 20 Hz. Note that the LAN of FIG. 1 may be coupled to one of the computers through a modem operating within the normal telephony voice band so that the LAN within the home of FIG. 1 may communicate through the common carrier network.

Another advantage of the disclosed encoding/decoding is that the entire mechanism is self clocking, that is for example, no phase lock loop is required at the receiver. Additionally, equalization is much less difficult since the disclosed encoding/decoding need only deal with timing and signal conditions for a relatively short period.

Thus, a data transmission and reception method and apparatus has been described which relies primarily on time rather than amplitude for the transmission of data. The network is particularly useful in applications where there is irregular topology.

We claim:

1. A method for transmitting data where the data is represented by at least two states comprising the steps of:
   providing a first signal having a first duration to represent one of the two states;
   providing a second signal having a second duration different than the first duration to represent the other of the two states; and,
   transitioning the signals through a predetermined electrical condition for each transmitted data state without a time delay between the signals;
   wherein the first signal has a first amplitude and the second signal has a second amplitude different than the first amplitude and wherein a first product of the first duration and first amplitude approximately equals a second product of the second duration and second amplitude.

2. The method defined by claim 1 wherein the transitioning step comprises changing the signal from one polarity to another polarity.

3. The methods defined by claims 1 or 2 wherein the first duration and second duration are pseudorandomly dithered.

4. A method for transmitting data where the data is represented by at least two states comprising the steps of:
   providing a first signal having a first duration to represent one of the two states;
   providing a second signal having a second duration different than the first duration to represent the other of the two states; and,
   transitioning the signals through a predetermined electrical condition for each transmitted data state without a time delay between the signal wherein the first duration and second duration are pseudorandomly dithered.

5. A method for detecting data where the data is represented by at least two states comprising the steps of:

recognizing one of the two states from a first signal having a first duration;

recognizing the other of the two states from a second signal having a second duration;

detecting a predetermined electrical condition occurring without a time delay between the signals for each transmitted data state; and wherein the first signal has a first amplitude and the second signal has a second amplitude different than the first amplitude and wherein a first product of the first duration and first amplitude approximately equals a second product of the second duration and second amplitude.

6. A method for transmitting data comprising:

selecting a plurality N of time intervals each different from the other;

selecting a bit packet for each of the N time intervals;

generating a signal which transitions between at least two states with intervals between the transitions being selected from the N time intervals which are pseudo-randomly dithered so as to correspond to bit packets which are to be transmitted.

* * * * *